May 30, 1933.   C. H. RANKIN   1,912,306
MEANS FOR CIRCULATING GLASS IN THE FOREHEARTHS
OF GLASS MELTING TANKS
Filed May 29, 1929   2 Sheets-Sheet 1

Inventor
Carl H. Rankin
By James L. Norris
Attorney

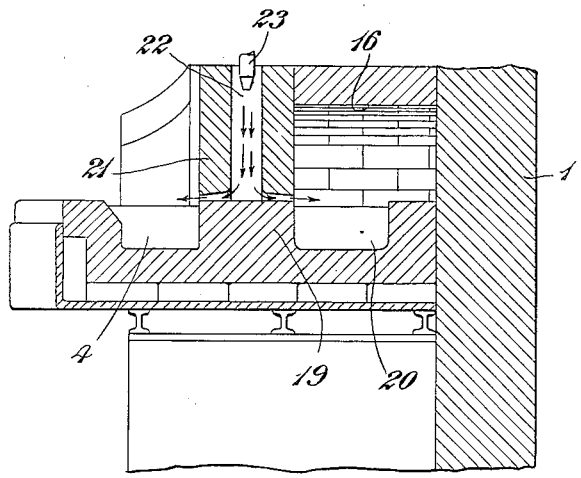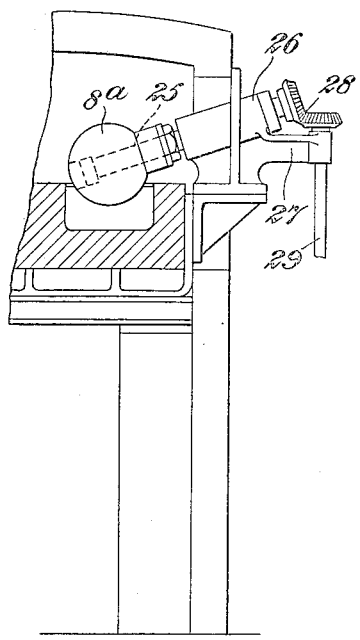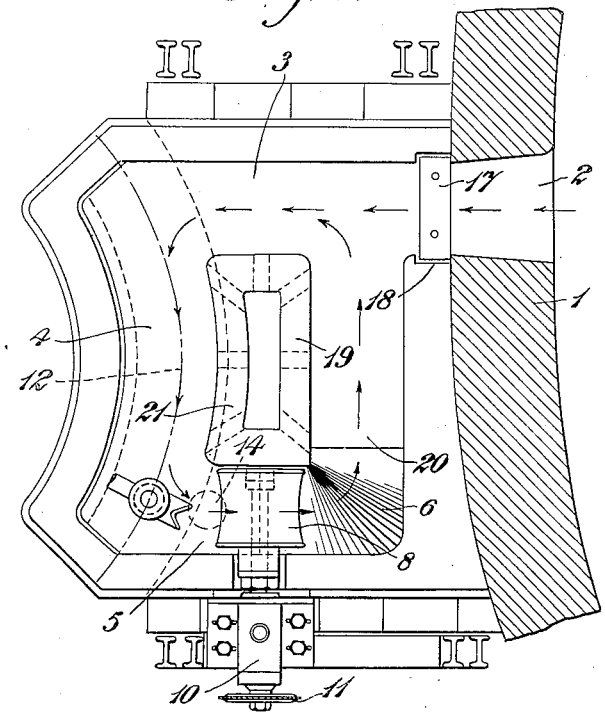

Patented May 30, 1933

1,912,306

UNITED STATES PATENT OFFICE

CARL HENRY RANKIN, OF YORK, ENGLAND, ASSIGNOR TO RANKIN AUTOMATIC GLASS FEEDER COMPANY, LIMITED, OF YORK, ENGLAND

MEANS FOR CIRCULATING GLASS IN THE FOREHEARTHS OF GLASS MELTING TANKS

Application filed May 29, 1929, Serial No. 367,067, and in Great Britain February 6, 1929.

This invention relates to improvements in suction dipping troughs or forehearths such as are employed in association with machines for manufacturing glassware, to contain a pool of molten glass in which parison moulds or like charge receiving devices can be successively dipped to take up and carry away separate charges of glass.

In the operation of such forehearths, unless means are provided to prevent stagnation of the glass therein, the temperature of the glass is liable to vary from place to place and particularly at the locality where the moulds or like receivers are lifted from the glass, the moils falling back into the forehearth from the rising mould or receiver having a chilling effect on the glass at this part.

The successively formed moils may be carried away by promoting a current of glass along the forehearth or trough whereby a fresh surface of glass is presented to each mould or receiver dipped in turn into the glass and for this purpose it has been proposed to employ vaned wheels or paddles actuated in any suitable manner to effect the desired movement or flow of the glass.

According to this invention improved means are provided for promoting a circulation of the glass in a forehearth or like trough the said means comprising a rotary member having a peripheral surface which is polygonal, or a figure of revolution, for example, a spherical, cylindrical or parabolic surface which may be smooth, corrugated, beaded or ribbed. This rotary member is arranged dipping into or immersed in the glass which adheres to the surface of the said member and is carried along thereby in its rotary movement. In a convenient constructional arrangement the rotary member is mounted to rotate about a horizontal axis above a dam or weir. The rotary member dipping into the glass, when set in rotation, raises the glass from one side of the weir and deposits it on the opposite side thereof the glass being spread out in a layer of more or less uniform thickness as it passes over the top of the rotary member, the sill of the weir in some cases acting as a stripper to detach from the said member the glass thus transferred.

A wall or block may be provided in the forehearth or nose cup so that a circulatory track for the glass is provided therein entirely exterior to the melting tank. The means provided for promoting a circulation of glass around the said circulatory track is so placed that no rotatable, oscillatory or other movable stirring elements are in positions closely adjacent to the locality from which glass is supplied to the moulds. Thus the feeding operation is not interfered with although the molten glass is kept in constant motion past the dipping position, and stagnation of the glass at any point in the circuit is prevented.

The glass may be fed to the circulatory track from a melting furnace or tank through a passageway beneath a skimmer block used to prevent the passage of slag, dross or the like into the track, or for cutting off the supply of glass. The forehearth can be partly covered by a hood allowing for the insertion of a mould to withdraw glass by suction, the removal of the glass preferably taking place at a part of the circulatory track remote from the inlet thereto from the melting tank. It will be noted that the glass flowing in the circulatory track is brought into contact and mixed with hot glass flowing out of the melting tank at each tour of the track before the stream again reaches the position at which the glass is removed or withdrawn from the forehearth or nose cup.

In the accompanying drawings which show how the said invention can be conveniently and advantageously carried into practice:—

Figures 3 and 4 are views corresponding to Figures 1 and 2 illustrating an alternative arrangement of the trough or glass circulatory track in the forehearth.

Figure 5 shows a modified form of the rotary glass circulating or impelling element.

Figures 6 and 7 show sections of alternative forms of rotary impelling elements.

Figure 1:
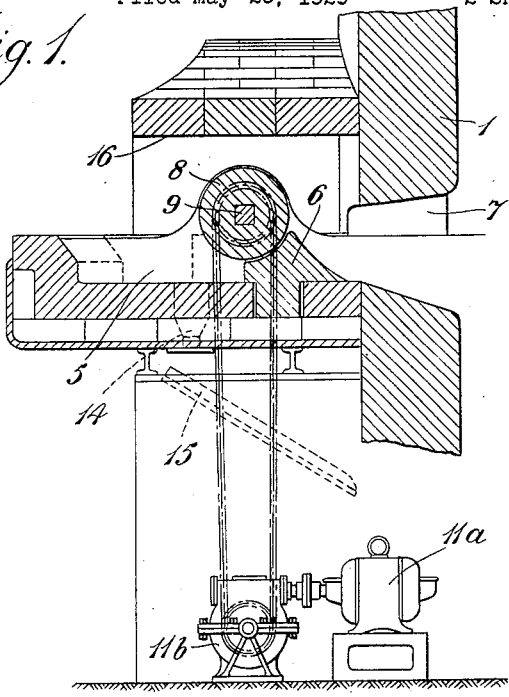
Figure 1 shows a sectional side view of a forehearth provided with a rotary glass circulating member in accordance with this invention.

In the improved construction of forehearth, glass is fed from the melting tank 1 through an opening 2 into a channel 3 of the forehearth, the said channel communicating with one end of a curved dipping trough or channel 4. The curved trough or channel 4 is made arc-shaped to conform to the path of the moulds of a rotary suction machine, and leads to a return channel 5 with a weir or dam 6 arranged therein, such channel being connected to the glass space in the melting tank by a further opening 7.

The glass flowing from the melting furnace along the supply channel 3 into the main channel 4 is drawn out from the main channel 4 by a rotary flow impelling element 8 arranged in the return channel 5 the glass passing over the dam or weir in the return channel being led back again to the melting tank through the opening 7. The dam or weir 6 arranged in the channel 5 can conveniently take the form of a replaceable block of refractory material.

The impelling element 8 is preferably arranged as shown directly above the dam or weir and takes the form of a roller, ball, or the like of refractory material of any convenient shape arranged to dip into the glass and such element is carried on a spindle 9 rotatably mounted in a bearing 10 which may be adjustably mounted on a bracket or other support. In the event of the roller or the weir becoming worn, the bearing 10 can be adjusted to maintain the correct clearance between the roller and the weir and in the event of either of these parts wearing out or being broken they can readily be replaced.

A sprocket wheel 11 is rigidly secured to the spindle 9 which can be thereby rotated at any required speed by a suitable motor 11a and variable velocity ratio gearing enclosed in a casing 11b.

It will readily be understood that, by rotating the impelling element 8 in a clockwise direction (Figure 1) the glass on one side of the dam or weir adhering to the element will be carried round with it until it is scraped off by the edge of the dam or weir on the opposite side of the latter and will be then returned to the melting tank. By this means the body of glass in the channels of the forehearth can be maintained in constant circulation.

It will be seen that the hot glass from the melting tank is carried by the channel 3 directly to the path of the suction mould, indicated by the line 12, at a point in this path at which the mould is lowered into the glass. Suction continues until the mould reaches the position where such mould, shown diagrammatically at 13, is raised out of the glass and the depending moil or tail of glass is sheared off.

If desired the floor of the channels 3, 4 can be arranged to fall slightly from the inlet opening 2 to a position below the rotary element and a drain opening 14 can be arranged at this point provided with a removable sealing plug, for the purpose of draining the forehearth. A deflector chute 15 is arranged to receive the glass when the trough is being drained and convey it to a suitable receptacle.

The weir 6 may be so arranged that its top is slightly higher than the glass level in the tank and the channels 3, 4, so that it prevents glass from flowing out through the opening 7 into the channel 4 when the rotary element 8 is not operating.

Figure 2:
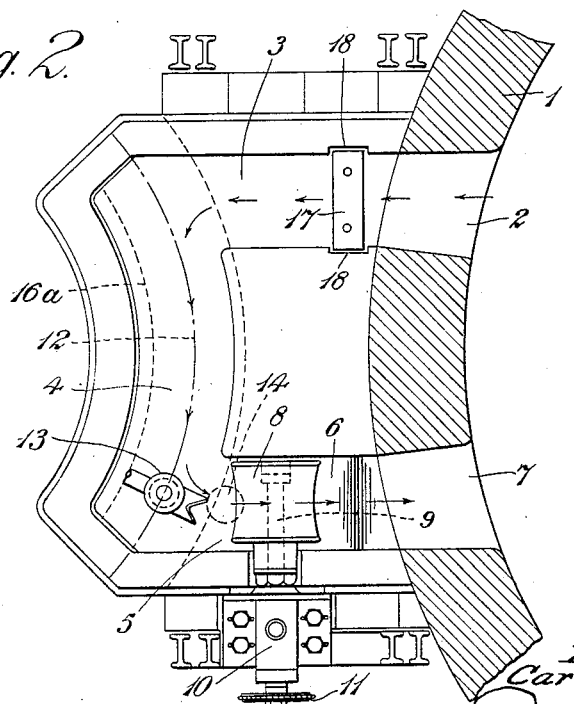
Figure 2 is a plan thereof.

A jack arch 16 is built over the forehearth the front of such arch being curved as shown by the dotted line 16a in Figure 2 to be clear of the suction mould and its associated parts travelling along the channel 4.

A refractory block 17 mounted in guideways 18 between the opening 2 and channel 3, is adjustable vertically. Normally this block is lowered until its lower face is just below the glass level when it acts as a skimmer and prevents any dross or pieces of refractory material which may be floating on the glass from entering the main channel 3. This block is also used to control the rate at which glass flows from the melting tank into the channel 3, and in the event of it being necessary to stop the machine for any length of time this block can be lowered on to a seat on the floor of the channel thereby entirely stopping the flow of glass out of the melting tank.

In the modified arrangement shown in Figure 3, the forehearth is constructed with a wall or block 19 of refractory material rising above the glass level and in addition to the channels 3, 4 and 5, a channel 20 is formed connecting the opposite ends of the channels 3 and 5 to those connected by the channel 4 so that the wall or block is surrounded by a circulatory track for the glass entirely exterior to the melting tank.

Glass is admitted to the channel 3 through an opening 2 under the control of a gate or skimmer block 17, and a rotary impelling member 8 is provided to cause the glass to circulate round the island block 19, preferably in the direction coinciding with the direction of travel of the suction moulds along the path 12. In this case the glass passing the rotary impeller 8 is not returned to the melting tank but is kept in motion past the inlet opening 2 through which glass is allowed to enter the circulatory track to make up for glass withdrawn by the suction moulds so that the level of the glass in the circulatory track is maintained. The glass while travelling along the circulatory track may tend to cool. The cooled glass is however reheated by mingling with hotter glass flowing out of the tank.

A block 21 of refractory material may be inserted in the arch 16 resting on the insular block 19. This block can be formed with a flame passage 22 into which a burner 23 can be inserted to provide a flame issuing through flame orifices 24 above the surface of the glass in the forehearth to maintain or raise the temperature of this glass.

If desired the construction of forehearth with an insular block surrounded by a glass circulatory track, as shown in Figure 3, may be provided with two openings forming communication ways between the said circulatory track and the melting tank, as in Figure 1, each of the communication ways being controlled by a gate, such as the gate 17 so that when one communication way is open the other can be kept closed. The rotary flow impelling element can also be rotated so as to move the glass in the channel 4 either in the same direction or in the opposite direction to the movement of the suction mould 13.

The roller 8 of Figures 2 and 4 may be replaced by a ball 8a of refractory material, as shown in Figure 5. This ball may be supported on a spindle 25 mounted in an antifriction bearing 26, the axis of the said spindle being inclined to reduce the tendency of the glass carried over in the rotation of the ball, to creep or flow over the ball to the bearing. The bearing can be carried on an adjustable bracket 27 and rotary motion transmitted to the spindle 25 through bevel gearing 28 by a rotary shaft 29. In place of the bevel gearing any other suitable transmission may be employed, for example, a universal joint.

As above mentioned impelling elements of other shapes than that of the roller 8 or ball 8a can be employed, for example, the impelling element may have a polygonal cross section as shown in Figure 6 or a corrugated cross section as shown in Figure 7.

I claim:

1. Apparatus for delivering molten glass to moulds, comprising a melting tank, a forehearth communicating with the tank and an island wall in said forehearth providing a circulatory track entirely exterior to the melting tank, part of said track passing between the island wall and the exterior wall of the tank.

2. Apparatus for delivering molten glass to moulds comprising a melting tank, a forehearth, an island wall in the said forehealth providing a circulatory track entirely exterior to the said melting tank, a single opening forming a communication channel between the interior of the melting tank and the circulatory track, and a gate controlling the supply of glass from the tank to the said track.

3. Apparatus for delivering molten glass to moulds, comprising a melting tank, a foreheaith communicating with the tank and arranged to provide a circulatory track for glass entirely exterior to the tank, an island wall within the forehearth surrounded by said track, and a flame passage for directing a heating flame upon the surface of the glass in the said track.

4. Apparatus for delivering molten glass to moulds, comprising a melting tank, a forehearth communicating with the tank and entirely exterior to the latter, a block within said forehearth, a circulatory track in said forehearth surrounding said block, and a second block supported above the first-named block and having a flame passage formed therein.

5. Apparatus for delivering molten glass to moulds, comprising a melting tank, a forehearth communicating with the tank, a block within the forehearth, and a circulatory track entirely exterior to the melting tank, said track comprising a part passing between the block and the exterior of the wall of the tank and another part substantially concentric with a circular path of movement of the moulds.

6. Apparatus for delivering molten glass to moulds, comprising a melting tank, a forehearth communicating with the tank and arranged to provide a circulatory track for molten glass entirely exterior to the tank, an island wall within the forehearth and surrounded by the said track, a portion of the said track being arranged concentric to a circular path along which the moulds are moved.

7. Apparatus for delivering molten glass to moulds, comprising a melting tank, a forehearth, an island wall in said forehearth providing a circulatory track for the glass entirely exterior to the tank, part of said track passing between the island wall and the exterior wall of the tank, and means for maintaining a circulation of molten glass in the said track.

8. Apparatus for delivering molten glass to moulds comprising a melting tank, a forehearth, a circulatory track exterior to the melting tank, an island wall in the forehearth surrounded by the said track, and a single opening forming a communication channel between the interior of the melting tank and the circulatory track.

CARL HENRY RANKIN.